US011811280B2

(12) United States Patent
Galmiche et al.

(10) Patent No.: US 11,811,280 B2
(45) Date of Patent: Nov. 7, 2023

(54) SQUIRREL-CAGE ROTOR AND ASSOCIATED ASYNCHRONOUS ELECTRICAL MACHINE

(71) Applicant: GE Energy Power Conversion Technology Limited, Warwickshire (GB)

(72) Inventors: Christophe Galmiche, Toul (FR); Remy Muller, Belfort (FR); Pierre Humbert, Gremecey (FR)

(73) Assignee: GE Energy Power Conversion Technology Limited, Warwickshire (GB)

( * ) Notice: Subject to any disclaimer, the term of this patent is extended or adjusted under 35 U.S.C. 154(b) by 305 days.

(21) Appl. No.: 17/271,564

(22) PCT Filed: Nov. 4, 2019

(86) PCT No.: PCT/EP2019/080109
§ 371 (c)(1),
(2) Date: Feb. 25, 2021

(87) PCT Pub. No.: WO2020/094574
PCT Pub. Date: May 14, 2020

(65) Prior Publication Data
US 2021/0184551 A1 Jun. 17, 2021

(30) Foreign Application Priority Data

Nov. 6, 2018 (FR) .................................. 1860205

(51) Int. Cl.
*H02K 17/16* (2006.01)
*H02K 1/28* (2006.01)
*H02K 15/00* (2006.01)

(52) U.S. Cl.
CPC ............. *H02K 17/165* (2013.01); *H02K 1/28* (2013.01); *H02K 15/0012* (2013.01)

(58) Field of Classification Search
CPC .... H02K 17/165; H02K 1/28; H02K 15/0012; H02K 5/24
See application file for complete search history.

(56) References Cited

U.S. PATENT DOCUMENTS 1,823,337 A 9/1931 Sheely
3,335,308 A * 8/1967 Robinson ............. H02K 17/165
310/211

(Continued)

FOREIGN PATENT DOCUMENTS

DE 2226015 B1 8/1973
EP 0609645 A1 8/1994

(Continued)

OTHER PUBLICATIONS

Translation (Extracts) of the Written Opinion on the Patentability of the Invention from FR Appl. No. FR 18 60205, 12 pages.

*Primary Examiner* — Thomas Truong
(74) *Attorney, Agent, or Firm* — WOOD IP LLC

(57) ABSTRACT

The rotor for a squirrel-cage asynchronous rotating electrical machine comprises two compaction elements clamping a cylindrical magnetic mass, short-circuit rings facing the face of the compaction elements opposite that in contact with the magnetic mass, and conductive bars housed in recesses in the magnetic mass and distributed evenly over at least one diameter of the magnetic mass such that the short-circuit rings and the conductive bars form a squirrel cage. Retaining means distributed over at least one diameter of each short-circuit ring and over at least one diameter of each compaction element interact so as to secure the short-circuit rings and the compaction elements together, the pitch circle diameters of the retaining means on the rings and the (Continued)

compaction elements being smaller than the pitch circle diameter of the conductive bars.

19 Claims, 12 Drawing Sheets

(56) References Cited

U.S. PATENT DOCUMENTS

| | | | |
|---|---|---|---|
| 5,512,792 A * | 4/1996 | Bawin | H02K 17/165 |
| | | | 310/211 |
| 5,719,457 A | 2/1998 | Helfer | |
| 6,177,750 B1 * | 1/2001 | Tompkin | H02K 1/28 |
| | | | 310/216.127 |
| 7,019,428 B2 | 3/2006 | Sato | |
| 2008/0174203 A1 * | 7/2008 | Makino | H02K 3/522 |
| | | | 310/270 |
| 2017/0054351 A1 * | 2/2017 | Ishikawa | H02K 1/12 |
| 2018/0026505 A1 * | 1/2018 | Galmiche | H02K 17/165 |
| | | | 310/211 |

FOREIGN PATENT DOCUMENTS

| | | |
|---|---|---|
| EP | 0749198 A2 | 12/1996 |
| FR | 2859049 A1 | 2/2005 |
| WO | 2014/124762 A2 | 8/2014 |
| WO | 2020/094574 A1 | 5/2020 |

* cited by examiner

SQUIRREL-CAGE ROTOR AND ASSOCIATED ASYNCHRONOUS ELECTRICAL MACHINE

FIELD OF THE INVENTION

The present invention concerns squirrel-cage asynchronous rotating electrical machines and relates more particularly to a device for retaining the short-circuit rings incorporated in a rotor of the machine.

The present invention further relates to a rotating electrical machine comprising such a rotor.

BACKGROUND

In general, the rotor of an asynchronous rotating electrical machine operating at peripheral speeds of less than 200 m/s comprises short-circuit rings connected to conductive bars inserted into the magnetic mass of the rotor to form a squirrel cage, the short-circuit rings and the conductive bars generally being made of copper or copper alloy.

Reference is made to FIG. 1, which shows a partial view of a rotor 1 comprising a magnetic mass 2 clamping a shaft 3. The magnetic mass 2 comprises magnetic sheets 4 clamped between clamping plates 5 and conductive bars 6.

The rotor 1 further comprises a short-circuit ring 7 in contact or not in contact with the face of the clamping plate 5 opposite that in contact with the magnetic sheets 4.

The conductive bar 6 is inserted into the short circuit ring 7 to hold the ring 7 and to form a squirrel cage.

A retaining ring 8 binds the short-circuit ring 7 to prevent the short-circuit ring from being projected outside of the rotor 1 under the effect of centrifugal force.

The retaining ring 8 is generally made of non-magnetic steel to prevent the retaining ring from heating up under the effect of the magnetic fields generated by stator coils.

The retaining ring 8 is generally made of stainless steel.

Reference can also be made to the European patent document EP2149970 which describes such a rotor.

However, stainless steel is an expensive material that is difficult to machine.

Stainless steel has very low non-magnetic properties and high mechanical properties, in particular a high yield strength, such that the stainless steel retaining ring 8 retains the short-circuit ring 7 which is far heavier under the effect of centrifugal force than the retaining ring 8.

The radial thickness of the retaining ring 8 is thinner than the radial thickness of the short-circuit ring 7 to allow the short-circuit ring to have sufficient radial thickness for the passage of an electric current originating from the conductive bars 6.

Reference can be made to the patent documents U.S. Pat. No. 7,919,895 and EP2866335, which describe a clamping plate comprising a recess for housing the short-circuit ring.

To improve the loopback of the flux paths, the conductive bars are disposed as close as possible to the peripheral surface of the magnetic mass. Since the conductive bars are in contact with the short-circuit discs, the radial outer thickness of material available to hold the short-circuit discs under the effect of centrifugal force in a radial direction is reduced.

As a result, the peripheral speed of the rotor is limited to avoid breakage of the material keeping only the short-circuit rings on the outer diameter thereof under the effect of centrifugal force.

Moreover, the short-circuit rings do not include a retaining shoulder under the conductive bars.

The patent documents EP2849320 and U.S. Pat. No. 9,935,533 disclose short-circuit rings held by pins engaged in a part acting as a mould when the short-circuit ring is cast by a casting process.

However, the holding surface of the rings is limited, reducing the peripheral speed of the rotor to prevent the pins from breaking by shearing.

The international patent document WO2016055199 discloses short-circuit rings held by metal rods passing through the magnetic mass.

However, the through-hole in the rod weakens the magnetic mass.

Moreover, the radial holding surface of the short-circuit ring is limited to prevent the rod from breaking by shearing and bending in the radial direction under the effect of centrifugal force.

Reference can be made to the international patent document WO2015188985 which discloses a rotor comprising a disc clamping a shaft.

The short-circuit ring is mounted on the disc.

However, under the effect of centrifugal force, the short-circuit ring is not held.

The patent documents WO2014124762, WO2016055186 and U.S. Pat. No. 9,130,434 disclose short-circuit rings held by tabs.

However, the peripheral speed of the rotor is limited so as not to damage the holding tabs by shearing and bending under the effect of centrifugal force.

The devices for holding the short-circuit rings known in the prior art are adapted for peripheral rotor speeds of about 110 m/s.

The present disclosure thus proposes overcoming the drawbacks of the rotors of prior art with a squirrel-cage asynchronous rotating electrical machine disclosed herein.

SUMMARY

Disclosed herein are a squirrel-cage asynchronous rotating electrical machine having increased peripheral speed of the rotor without using a non-magnetic steel retaining ring.

In light of the above, the invention proposes a rotor for a squirrel-cage asynchronous rotating electrical machine comprising two compaction elements clamping a cylindrical magnetic mass, short-circuit rings facing the face of the compaction elements opposite that in contact with the magnetic mass, and conductive bars housed in recesses in the magnetic mass and distributed evenly over at least one diameter of the magnetic mass such that the short-circuit rings and the conductive bars form a squirrel cage.

Retaining means distributed over at least one diameter of each short-circuit ring and over at least one diameter of each compaction element interact so as to secure the short-circuit rings and the compaction elements together, the pitch circle diameters of the retaining means on the rings and the compaction elements being smaller than the pitch circle diameter of the conductive bars.

According to one feature, the retaining means comprise a groove in the at least one diameter of the compaction element, a lug on the at least one diameter of the short-circuit ring such that the lug fits into the groove to form a shoulder, and screws evenly distributed over at least one diameter of the short-circuit ring to secure the short-circuit ring and the compaction element together.

Preferably, the retaining means further comprise a second groove in a second diameter of the compaction element and a second lug on a second diameter of the short-circuit ring such that the second lug fits into the second groove to form a second shoulder, the second diameters being smaller than the first diameters.

Advantageously, the rotor further comprises screws distributed over a second diameter of the short-circuit ring, the screws on said second diameter passing through the lug.

According to another feature, the retaining means comprise a groove in the at least one diameter of the short-circuit ring, a lug on the at least one diameter of the compaction element such that the lug fits into the groove to form a shoulder, and screws evenly distributed over at least one diameter of the short-circuit ring to secure the short-circuit ring and the compaction element together.

Preferably, the retaining means further comprise a second groove in a second diameter of the compaction element such that one end of the short-circuit ring fits into the second groove to form a second shoulder, the second diameter being smaller than the first diameter.

Advantageously, holes are evenly distributed over a diameter of the short-circuit ring to house the conductive bars, the pitch circle diameter of the bars in the short-circuit ring being smaller than the pitch circle diameter of the conductive bars in the magnetic mass in order to produce a radial bending preload of the conductive bars.

Preferably, holes, advantageously circular holes, are evenly distributed over a diameter of the short-circuit ring to house the conductive bars in the magnetic mass, the holes being coaxial with the recesses of the conductive bars, the holes having a dimension that is smaller than a dimension of the conductive bars such that when the bars are inserted into the holes, a knurled end of each conductive bar deforms to create an electrical contact between said bar and the short-circuit ring.

Advantageously, the retaining means at each end of the rotor are of different types.

Preferably, the retaining means comprise a groove in the at least one diameter of the short-circuit ring, a retaining ring comprising, on at least one diameter, a lug such that the lug fits into the groove to form a shoulder and such that the face of the retaining ring opposite that facing the short-circuit ring is in contact with the compaction element, and screws distributed evenly over at least one diameter of the retaining ring to secure the retaining ring and the compaction element together.

According to another feature, the retaining means comprise a retaining ring secured to the compaction element by screws distributed evenly over at least one diameter of the retaining ring and comprising a groove in at least one diameter, the short-circuit ring comprising a lug on at least one diameter located on the face opposite that facing the compaction element such that the lug fits into the groove so as to hold the short-circuit ring.

Preferably, the short-circuit ring further comprises a second retaining lug opposite the retaining lug and the compaction element comprises a second groove interacting with the second retaining lug.

Advantageously, the retaining means further include a lug on a diameter of the retaining ring which fits into a groove in the compaction element so as to form a shoulder, the lug being located between the axis of rotation of the rotor and the pitch circle diameter of the fixing screws. Preferably, the retaining means further comprise a second groove in at least one diameter of the retaining ring and a second lug on a second diameter of the short-circuit ring located on the face opposite that facing the compaction element such that the second lug fits into the second groove so as to hold the short-circuit ring.

Advantageously, the retaining means comprise a retaining ring secured to the compaction element by screws distributed evenly over at least one diameter of the retaining ring and comprising a groove in at least one diameter, the short-circuit ring comprising a groove in at least one diameter located on the face facing that of the compaction element, and a holding ring comprising a face in contact with the compaction element and a groove in the face opposite that in contact with the compaction element such that the ends of the holding ring fit into the grooves of the short-circuit ring and of the retaining ring.

Preferably, the ends of the conductive bars are brazed on the short-circuit rings.

According to another feature, the rotor further comprises a binding band surrounding the short-circuit ring, the binding band preferably being non-magnetic, for example made of stainless steel.

Advantageously, electrical insulation means are disposed under the head of the screw and/or along the screw body and/or between the short-circuit ring and the compaction element.

Preferably, the compaction element comprises a clamping plate or a compaction flange of a non-through half-shaft.

According to yet another aspect, the invention proposes a squirrel-cage asynchronous rotating electrical machine comprising a rotor as described hereinabove.

Other features and advantages of the invention will be better understood upon reading the following description given of embodiments of the invention, provided as non-limiting examples and with reference to the drawings disclosed herewith.

DETAILED DESCRIPTION

As used throughout, the term "Fig." is equivalent to FIG., which is an acronym for Figure.

Figure 1:
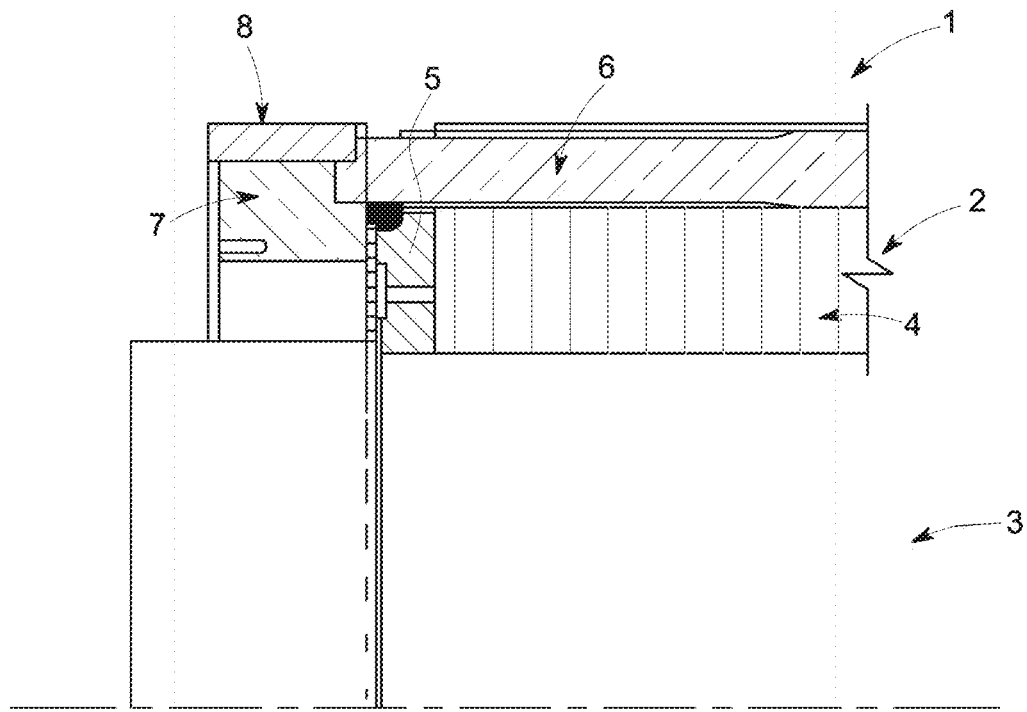
FIG. 1, which has already been mentioned, shows a rotor comprising a retaining ring according to the prior art.
Figure 2:
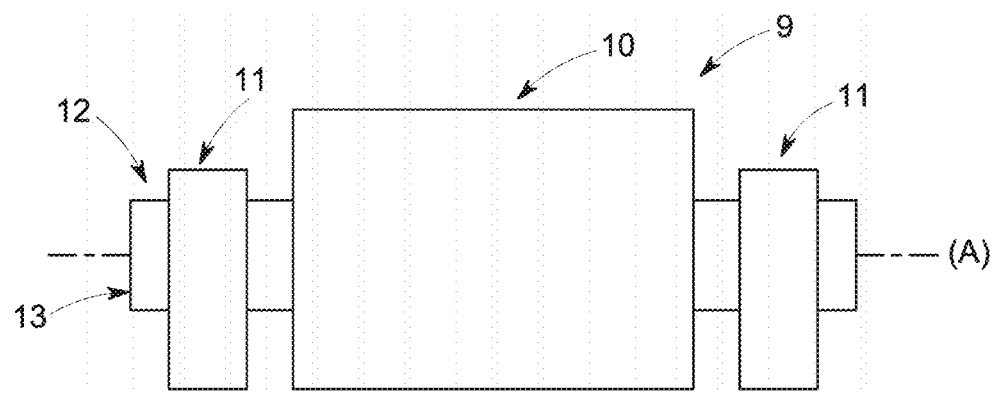
FIG. 2 shows one embodiment of an asynchronous rotating electrical machine.

Reference is made to FIG. 2, which shows one embodiment of an asynchronous rotating electrical machine 9 comprising a stator 10, bearings 11 and a rotor 12 inserted into the stator 10 and the bearings 11.

The rotor 12 comprises a rotor shaft 13 made, for example, of steel, having an axis (A) that is coincident with the rotational axis of the rotor 12.

Figure 3:
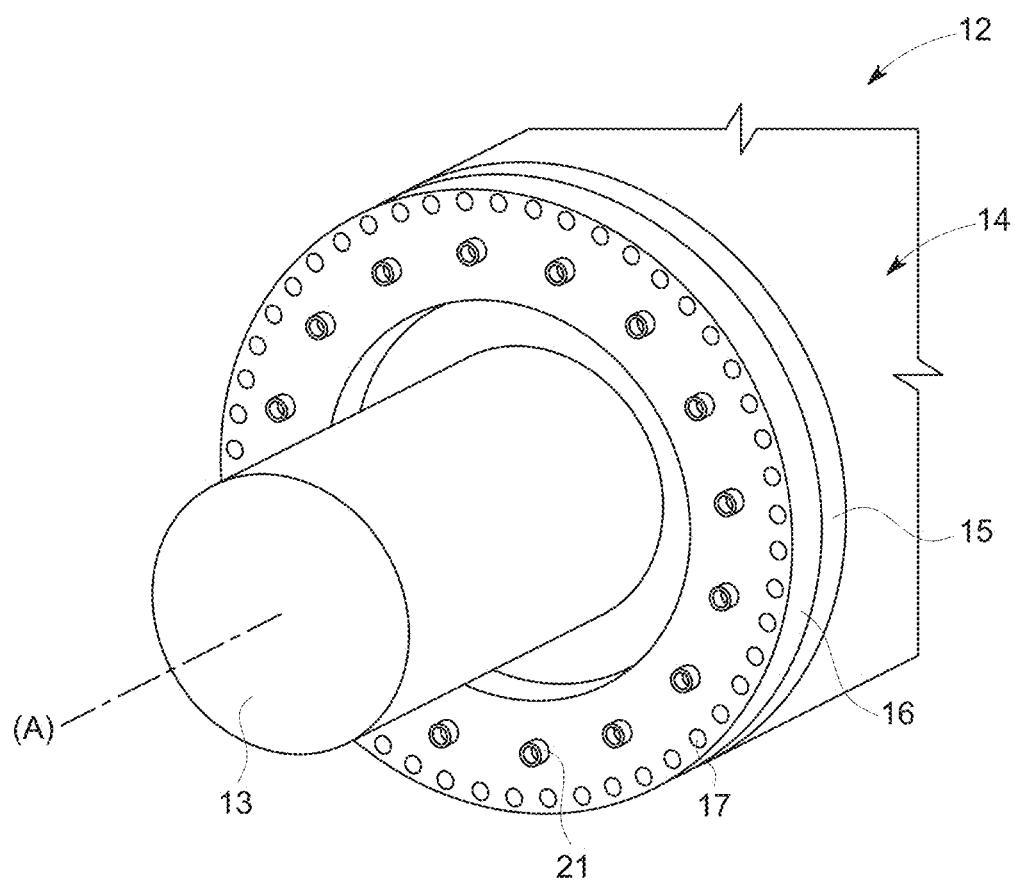
FIGS. 3 and 4 show a partial sectional view along an axial direction of a first embodiment of the rotor.
Figure 4:
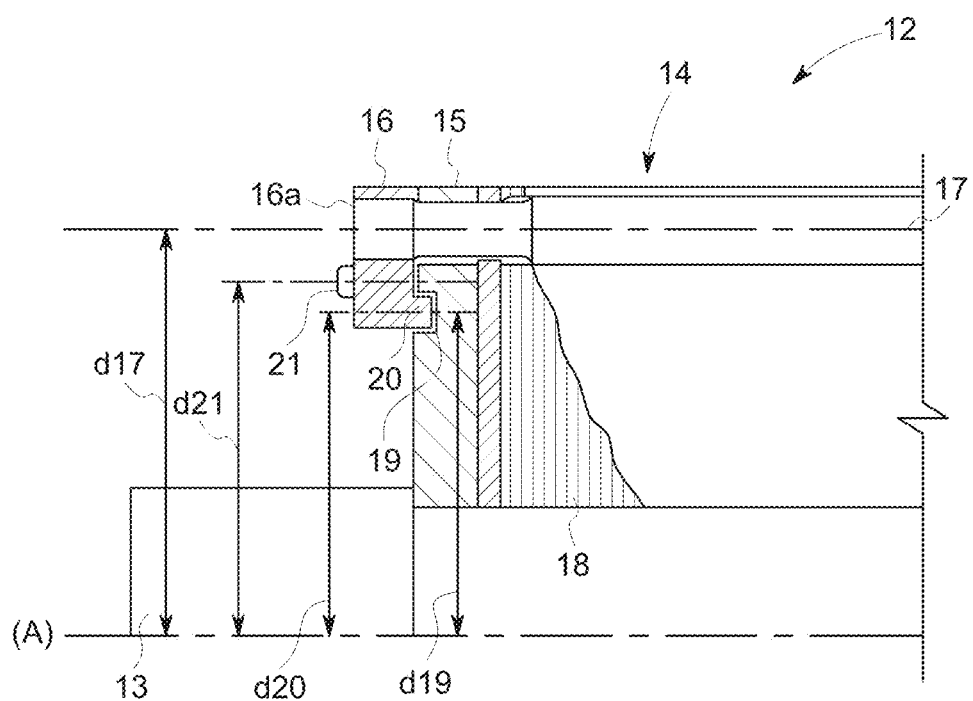

Reference is made to FIGS. 3 and 4, which show a partial view of a first embodiment of the rotor 12 and a partial sectional view along an axial direction of the rotor.

The rotor 12 comprises a cylindrical magnetic mass 14 clamped between two compaction elements comprising compaction plates 15, and short-circuit rings 16 in contact with the face of the compaction plates 15 opposite that in contact with the magnetic mass 14 comprising laminated magnetic sheets 18.

The thickness of the magnetic sheets 18 is preferably less than 2 mm, preferentially 0.65 mm or 0.5 mm.

Alternatively, the magnetic mass 14 can comprise metal plates, the thickness of the metal plates preferably being more than 5% of the outer diameter of the magnetic mass 14.

According to yet another alternative embodiment, the magnetic mass 14 can comprise a one-piece steel body.

The shaft 13 passes through the magnetic mass 14, the compaction plates 15 and the short-circuit rings 16.

Conductive bars 17 are housed inside recesses in the magnetic mass and are evenly distributed over at least one diameter d17 of the magnetic mass such that the short-circuit rings 16 and the conductive bars 17 form a squirrel cage.

The short-circuit rings 16 and the conductive bars 17 are made, for example, of copper or copper alloy.

The short-circuit ring 16 comprises a hole 16a coaxial with the recess for the conductive bar 17 such that the bar 17 is inserted into the ring 16.

The rotor 12 further comprises retaining means comprising a groove 19 in a diameter d19 of the compaction plate 15, a lug 20 on a diameter d20 of the short-circuit ring 16 such that the lug 20 fits into the groove 19 to form a shoulder, and screws 21 evenly distributed over a diameter d21 of the short-circuit ring 16 to secure the short-circuit ring 16 and the compaction plate 15 together.

The pitch circle diameters d20 of the lug 20 and d19 of the groove 19 are smaller than the pitch circle diameter d17 of the conductive bars 17.

The screws 21 are located between the lug 20 and the pitch circle diameter of the conductive bars.

Figure 5:
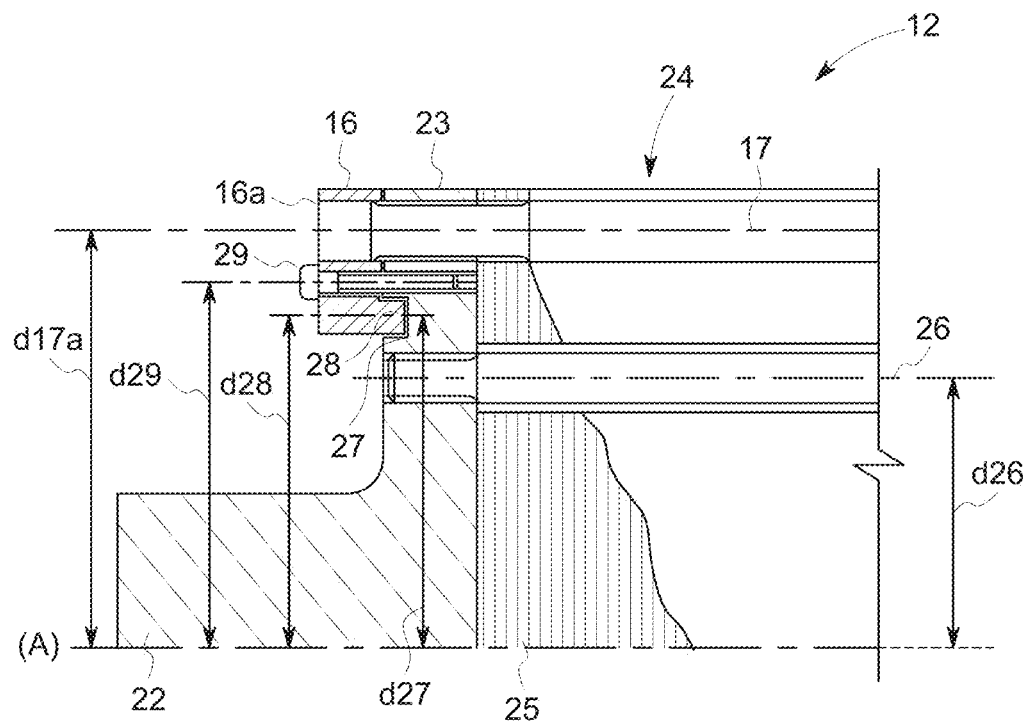
FIG. 5 shows a partial sectional view along an axial direction of a second embodiment of the rotor.

Reference is made to FIG. 5, which shows a partial sectional view along an axial direction of a second embodiment of the rotor 12.

The rotor 12 with a non-through shaft comprises two half-shafts 22 comprising compaction elements comprising compaction flanges 23 clamping a cylindrical magnetic mass 24 and the short-circuit rings 16 in contact with the face of the compaction flanges 23 opposite that in contact with the magnetic mass 24 comprising laminated magnetic sheets 25.

The thickness of the magnetic sheets 25 is preferably less than 2 mm, preferentially 0.65 mm or 0.5 mm.

Alternatively, the magnetic mass 24 can comprise metal plates, the thickness of the metal plates preferably being more than 5% of the outer diameter of the magnetic mass 24.

According to yet another alternative embodiment, the magnetic mass 24 can comprise a one-piece steel body.

The conductive bars 17 are housed inside recesses of the magnetic mass 24 and are evenly distributed over a diameter d17a of the magnetic mass 24 such that the short-circuit rings 16 and the conductive bars 17 form a squirrel cage.

The conductive bar 17 is inserted into the hole 16a in the short-circuit ring 16.

The magnetic mass 24 further comprises tie rods 26 connecting the two half-shafts to keep the magnetic mass 24 compacted.

The tie rods 26 are evenly distributed over a diameter d26 of the magnetic mass 24.

The rotor 12 further comprises retaining means comprising a groove 27 in a diameter d27 of the compaction flange 23, a lug 28 on a diameter d28 of the short-circuit ring 16 such that the lug 28 fits into the groove 27 to form a shoulder, and screws 29 evenly distributed over a diameter d29 of the short-circuit ring 16 to secure the short-circuit ring 16 and the compaction flange 23 together.

The pitch circle diameters d28 of the lug 28 and d27 of the groove 27 are smaller than the pitch circle diameter d17a of the conductive bars 17. The pitch circle diameter d26 of the tie rods 26 is smaller than the pitch circle diameter of the retaining means.

The screws 29 are located between the lug 28 and the pitch circle diameter of the conductive bars.

The conductive bars 17 are preferably inserted with radial clearance into the holes 16a so as to allow for the free axial thermal expansion of the conductive bars.

Figure 6:
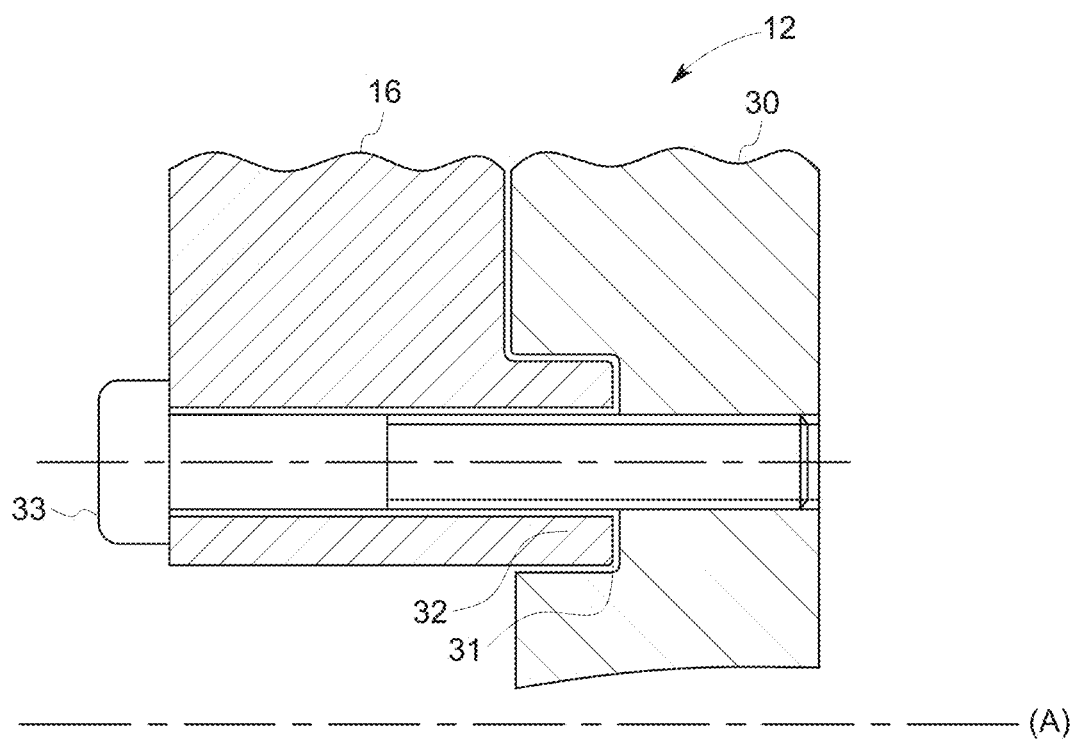
FIG. 6 shows a partial sectional view along an axial direction of a third embodiment of the rotor.

FIG. 6 shows a partial sectional view along an axial direction of a third embodiment of the rotor 12 comprising the short-circuit ring 16 and a compaction element 30.

The compaction element 30 can comprise the compaction plate 15 if the rotor 12 has a through-shaft or the compaction flange 23 if the rotor 12 has a non-through shaft or one end of the metal body if the magnetic mass of the rotor 12 is made in one piece.

If the rotor 12 is made in one piece, i.e. the shaft and the magnetic mass are a single unit, the compaction element 30 comprises an end of the magnetic mass.

The third embodiment of the rotor 12 further comprises a second embodiment of the retaining means.

The retaining means comprise a groove 31 in a diameter of the compaction element 30, a lug 32 on a diameter of the short-circuit ring 16 such that the lug 32 fits into the groove 31 to form a shoulder, and screws 33 evenly distributed over a diameter of the short-circuit ring 16 to secure the short-circuit ring 16 and the compaction element 30 together.

The screws 33 pass through the lug 32.

The pitch circle diameters of the lug 32 and of the groove 31 are smaller than the pitch circle diameter of the conductive bars 17.

In the embodiments of the retaining means described hereinabove, the lug and the groove have a rectangular cross-section.

Figure 7:
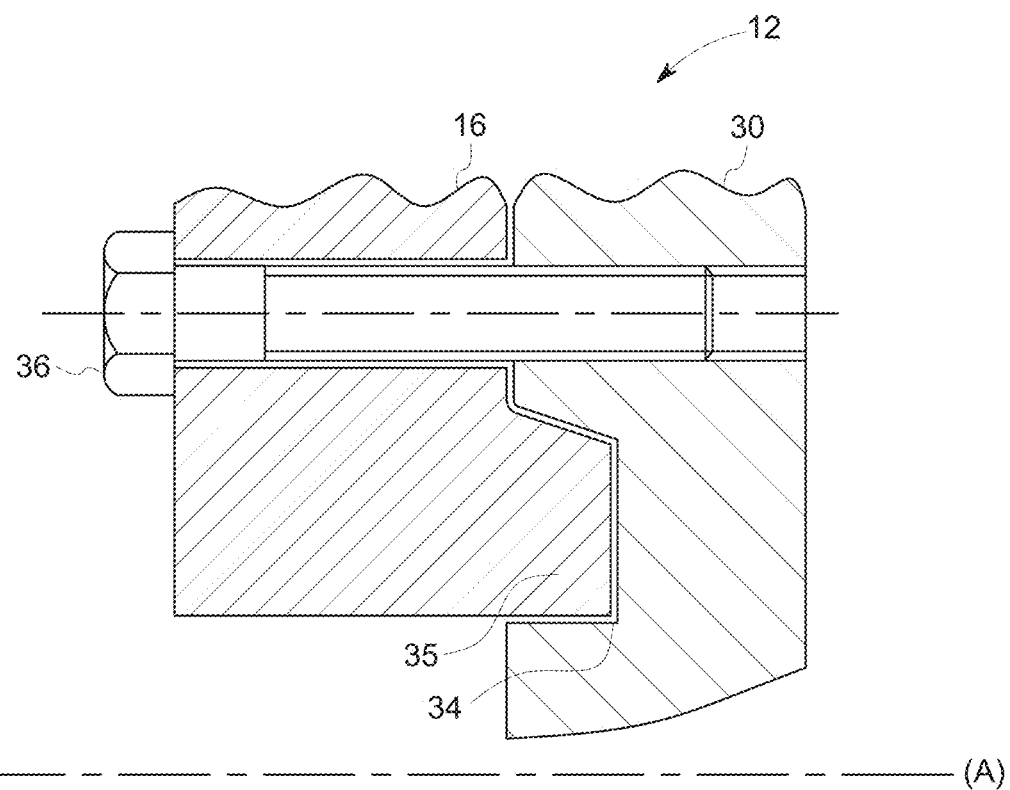
FIG. 7 shows a partial sectional view along an axial direction of a fourth embodiment of the retaining means.

The cross-section of the lug and of the groove can take various shapes, in particular a trapezoidal shape as shown in FIG. 7 showing a partial sectional view along an axial direction of a fourth embodiment of the retaining means.

It shows the short-circuit ring 16 and the compaction element 30.

The retaining means comprise a groove 34 having a trapezoidal cross-section in a diameter of the compaction element 30, a lug 35 having a trapezoidal cross-section on a diameter of the short-circuit ring 16 such that the lug 35 fits into the groove 34 to form a shoulder, and screws 36 evenly distributed over a diameter of the short-circuit ring 16 to secure the short-circuit ring 16 and the compaction element 30 together.

The pitch circle diameters of the lug 35 and of the groove 34 are smaller than the pitch circle diameter of the conductive bars 17.

The trapezoidal cross-section of the lugs 35 and groove 34 procure self-centring of the lug 35 in the groove 34 when assembling the short-circuit ring 16 in the compaction element 30.

The screws 36 are located between the lug 35 and the pitch circle diameter of the conductive bars.

In an alternative embodiment not shown, the screws 36 pass through the lug 35.

Figure 8:
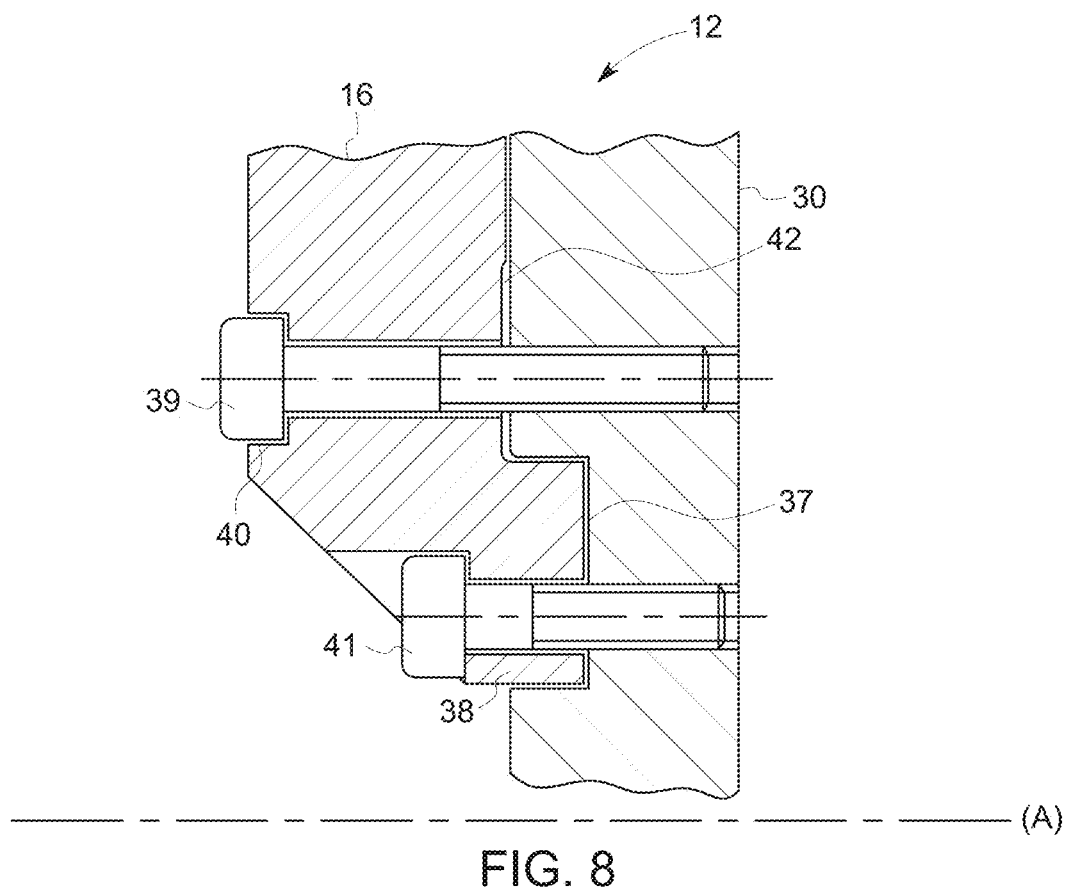
FIG. 8 shows a partial sectional view along an axial direction of a fifth embodiment of the retaining means.

FIG. 8 shows a partial sectional view along an axial direction of a fifth embodiment of the retaining means.

It shows the short-circuit ring 16 and the compaction element 30.

The retaining means comprise a groove 37 in a diameter of the compaction element 30, a lug 38 on a diameter of the short-circuit ring 16 such that the lug 38 fits into the groove 37 to form a shoulder, and screws 39 evenly distributed over a diameter of the short-circuit ring 16 to secure the short-circuit ring 16 and the compaction element 30 together.

The screws 39 are located between the lug 38 and the pitch circle diameter of the conductive bars.

Each head of the screws 39 is housed in a counterbore 40 in the short-circuit ring 16 such that the head of the screw is held in a radial direction under the effect of centrifugal force.

The retaining means further include screws 41 distributed over a second diameter of the short-circuit ring 16. The screws 41 distributed over the second diameter pass through the lug 38 and are housed in counterbores in the short-circuit ring in order to be radially held under the effect of centrifugal force.

The short-circuit ring 16 is held by two rows of screws 39 and 41 distributed over different diameters increasing the holding pressure of the ring 16 against the compaction element 30 compared to the embodiments of the retaining means described hereinabove.

The short-circuit ring 16 can comprise a hollowing 42 on the surface thereof in contact with the element 30 which is located on a larger diameter than the lug 38 so as to increase the contact pressure of the lug 38 in the bottom of the groove 37.

Figure 9:
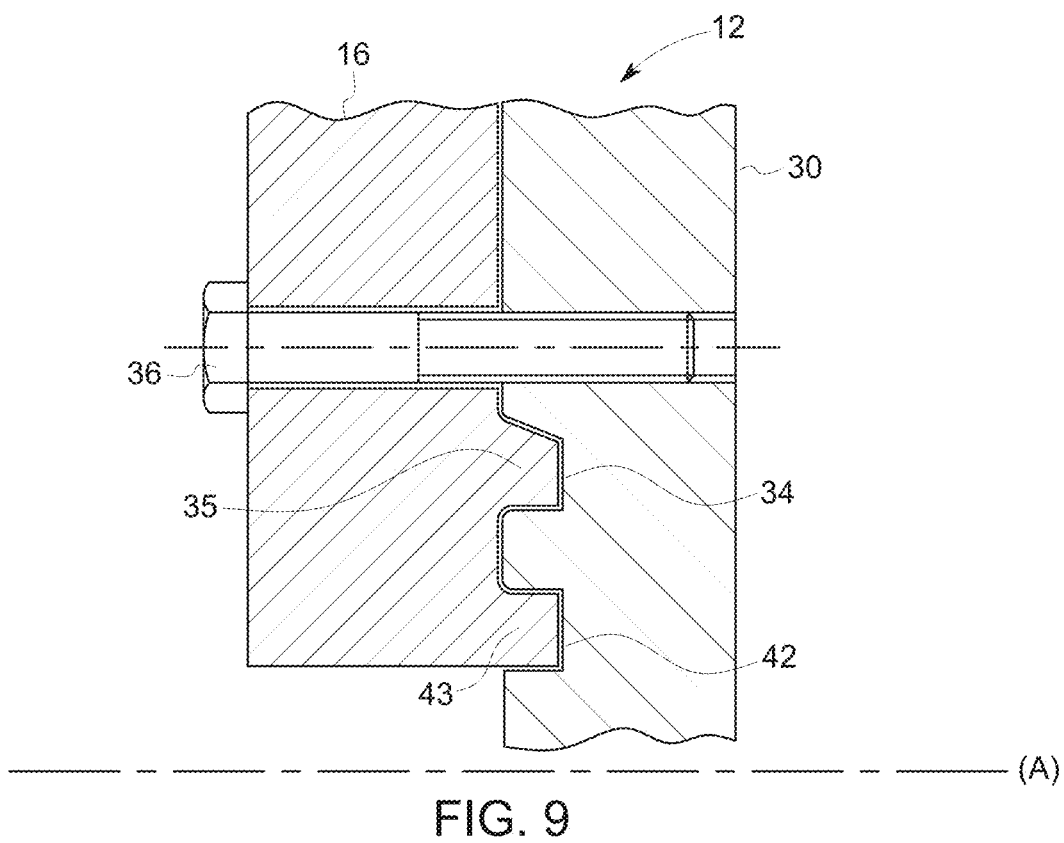
FIG. 9 shows a partial sectional view along an axial direction of a sixth embodiment of the retaining means.

It goes without saying that the embodiments described hereinabove can be combined, the embodiments described in FIGS. 4, 5, 6 and 7 can further include screws distributed over a second diameter of the short-circuit ring and/or a hollowing 42 as shown in FIG. 8, and the embodiments shown in FIGS. 4, 5, 6 and 8 can include a trapezoidal cross-section as shown in FIG. 7. FIG. 9 shows a partial sectional view along an axial direction of a sixth embodiment of the retaining means.

It shows the short-circuit ring 16 comprising the lug 35, the compaction element 30 comprising the groove 34 and the screws 36 according to the fourth embodiment of the retaining means described in FIG. 7.

The retaining means further comprise a second groove 42 in a second diameter of the compaction element 30 and a second lug 43 on a second diameter of the short-circuit ring 16 such that the second lug 43 fits into the second groove 42 to form a second shoulder, the second diameters being smaller than the first diameters.

The short-circuit ring 16 is held in the compaction element 30 by two shoulders increasing the radial holding of the short-circuit ring 16 under the effect of centrifugal force.

Moreover, since the ring 16 is held by two shoulders, the depth of the grooves 34 and 42 can be reduced compared to the embodiments describing a single groove in order to increase the stiffness of the compaction element 30.

It goes without saying that the retaining means can comprise more than two shoulders.

The shoulders have, for example, a trapezoidal or rectangular cross-section.

In the embodiments described hereinabove, the compaction element 15, 23, 30 has the same outer diameter as the outer diameter of the short-circuit ring 16.

According to other embodiments, the outer diameter of the compaction element 15, 23, 30 is smaller than the outer diameter of the short-circuit ring 16.

Figure 10:
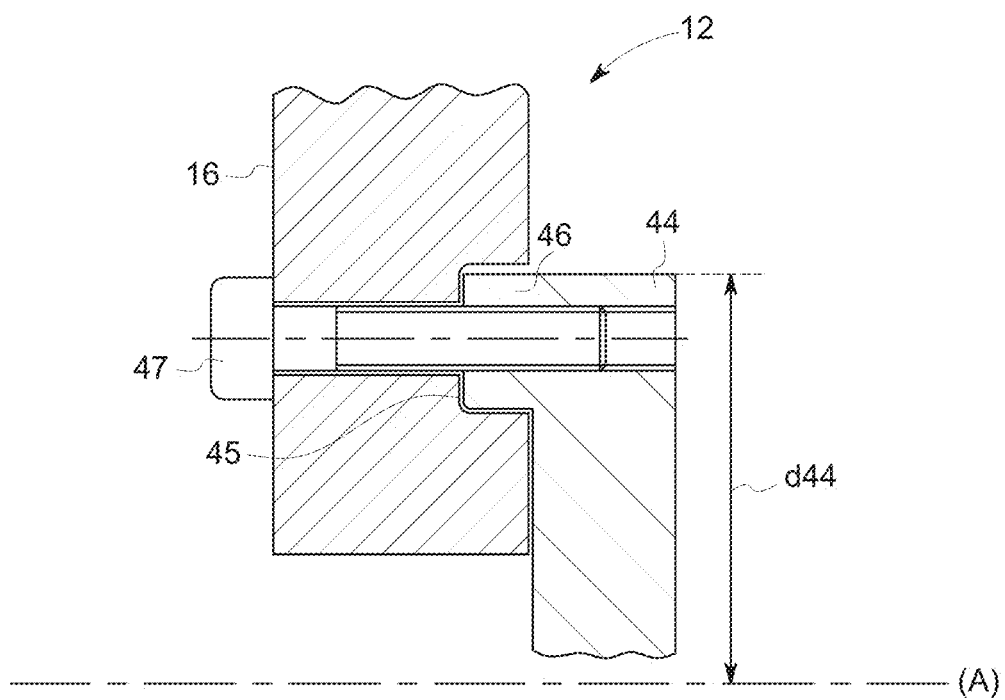
FIG. 10 shows a partial sectional view along an axial direction of a seventh embodiment of the retaining means.

FIG. 10 shows a partial sectional view along an axial direction of a seventh embodiment of the retaining means.

It shows the short-circuit ring 16 and a compaction element 44 which differs from the compaction element 30 in that the outer diameter d44 thereof is smaller than the outer diameter of the short-circuit ring 16.

The retaining means comprise a groove 45 in a diameter of the short-circuit ring 16, a lug 46 on a diameter of the compaction element 44 such that the lug 46 fits into the groove 45 to form a shoulder, and screws 47 evenly distributed over a diameter of the short-circuit ring 16 to secure the short-circuit ring and the compaction element together, the screws being engaged inside the lug 46.

Figure 11:
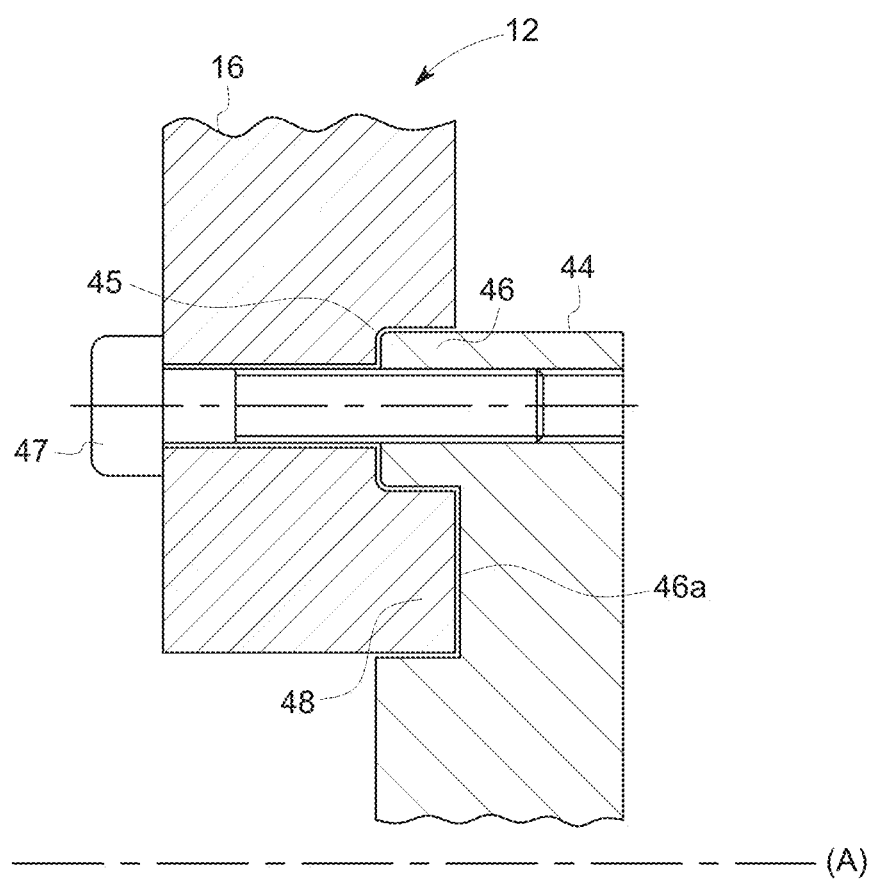
FIG. 11 shows a partial sectional view along an axial direction of an eighth embodiment of the retaining means.

FIG. 11 shows a partial sectional view along an axial direction of an eighth embodiment of the retaining means.

It shows the short-circuit ring 16 and the compaction element 44 comprising the groove 45, the lug 46 and the screws 47.

The retaining means further comprise a second groove 46a in a second diameter of the compaction element 44 such that one end 48 of the short-circuit ring 16 fits into the second groove to form a second shoulder, the second diameter being smaller than the first diameter.

In an alternative embodiment not shown, the retaining means further comprise screws distributed over a second diameter of the ring to secure the short-circuit ring and the compaction element together, the second pitch circle diameter of the screws being smaller than the first pitch circle diameter of the screws.

The screws on the second pitch circle diameter are engaged inside the groove 46a.

Figure 12:
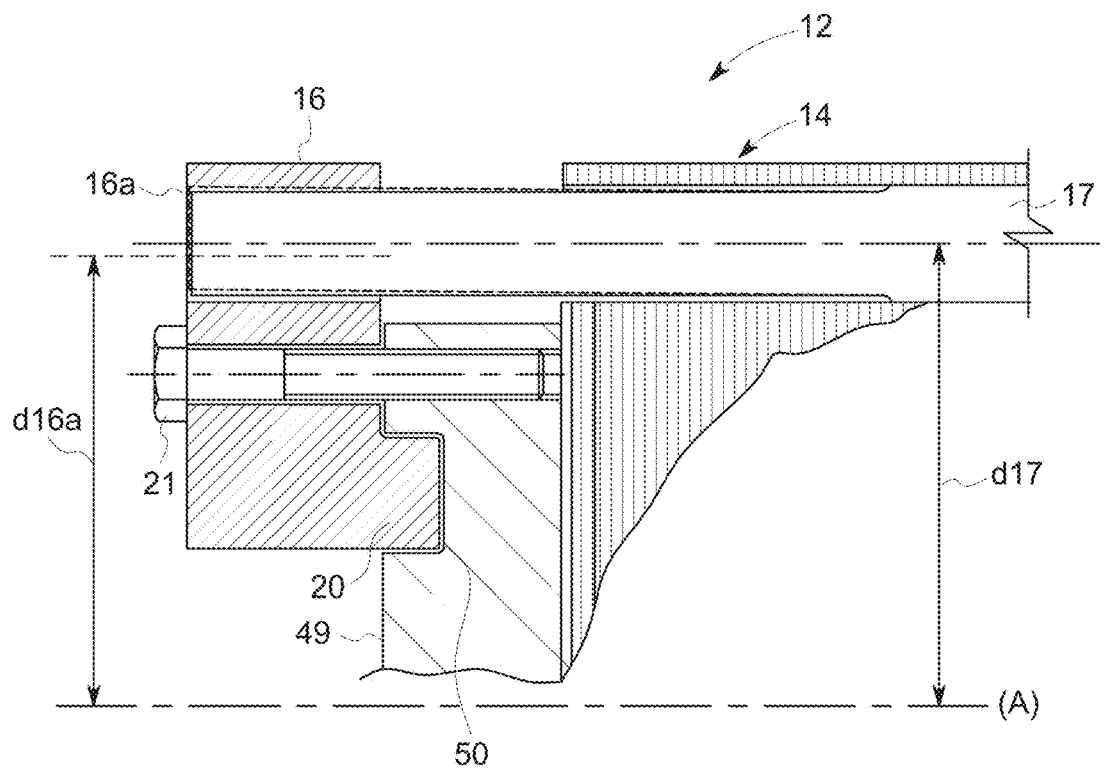
FIG. 12 shows a partial sectional view along an axial direction of a ninth embodiment of the retaining means.

FIG. 12 shows a partial sectional view along an axial direction of a ninth embodiment of the retaining means.

It shows the cylindrical magnetic mass 14, the short-circuit ring 16 comprising the lug 20 and the screws 21, and the conductive bar 17 described in FIGS. 3 and 4.

A compaction element 49 is inserted between the magnetic mass 14 and the short-circuit ring 16 differing from the compaction element 44 in that it comprises a groove 50 in a diameter of the compaction element 49 such that the lug 20 fits into the groove 50 to form a shoulder.

The pitch circle diameter d16a of the holes 16a in the short-circuit ring is smaller than the pitch circle diameter d17 of the conductive bars 17 in the magnetic mass 14.

The holes 16a, which are preferably circular in shape, are not coaxial with the pitch circle diameter of the conductive bars, which are preferably cylindrical in shape.

The conductive bar 17 is subjected to a bending preload in the hole 16a by the force of the screws 21 in order to establish an electrical contact with the short-circuit ring and prevent sparks when starting up the rotating electrical machine 9, since the centrifugal force during start-up is not sufficient to establish a good electrical contact.

In an alternative embodiment not shown, if the holes 16a, which are preferably circular in shape, are coaxial with the conductive bars 17, which are preferably cylindrical in shape, the end of the conductive bars 17 inserted into the holes 16a includes a knurling such that the ends of the knurling have a larger diameter than the diameter of the holes 16a.

When inserting the bars 17 into the holes 16a, the ends of the knurling are upset by the force of the screws 21 and procure the electrical contact between the ring 16 and the bars 17.

Alternatively, the holes 16a and the conductive bars 17 are rectangular or oblong in shape. The ends of the bars 17 can include a knurling with a cross-section that is larger than the cross-section of the holes 16a.

Figure 13:
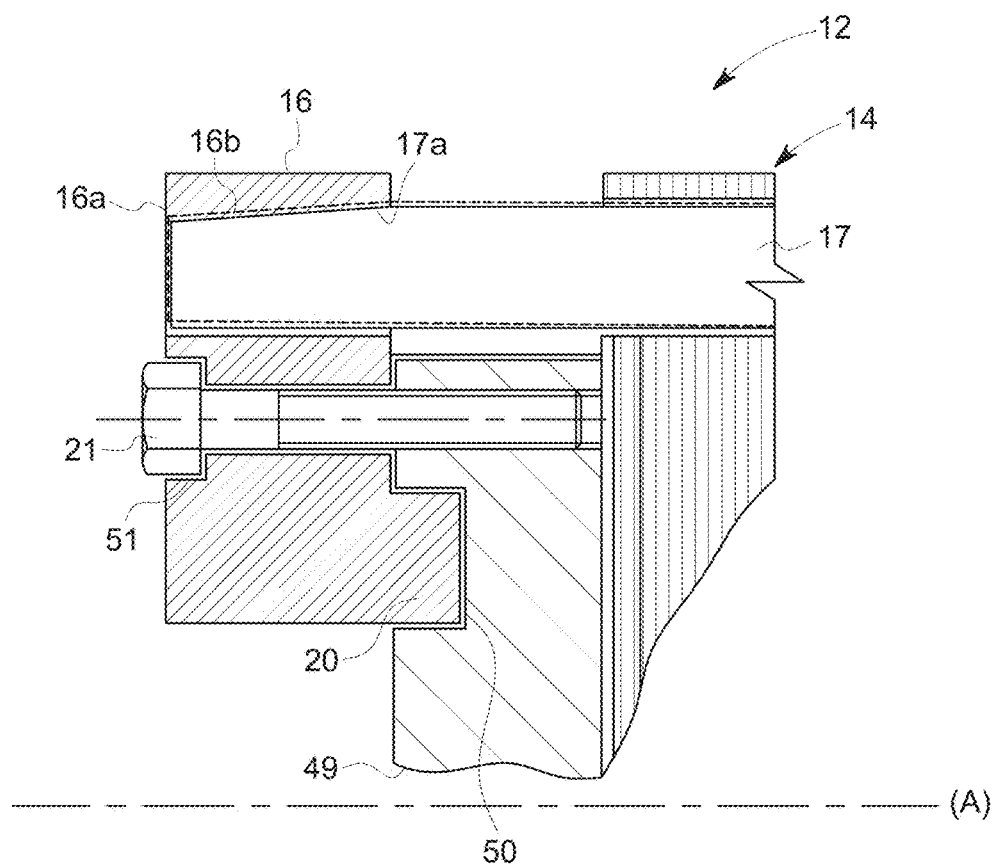
FIG. 13 shows a partial sectional view along an axial direction of a tenth embodiment of the retaining means.

FIG. 13 shows a partial sectional view along an axial direction of a tenth embodiment of the retaining means, which differs from the ninth embodiment of the retaining means shown in FIG. 12 in that the short-circuit ring 16 comprises a counterbore 51 wherein the head of the screw 21 is housed to ensure that the head of the screw is held radially under the effect of centrifugal force, and the hole 16a and the conductive bar 17 comprise a sloping side 16b and 17a such that when inserting the bar 17 into the hole 16a, the sloping sides come into contact to establish an electrical contact between the short-circuit ring 16 and the bar 17 and to prevent sparks when starting up the rotating electrical machine 9.

The bar 17, which preferably has a rectangular cross-section, is subjected to a gradual bending preload inside the hole 16a by the force of the screws 21 and the sloping sides 16b and 17a.

In FIGS. 12 and 13, the bending preload of the bars 17 is produced by the means for retaining the lug 20 in the groove 50 preventing the short-circuit ring 16 from deforming radially outwards under the effect of the bending forces of the bars 17.

In the embodiments described hereinabove, the conductive bars 17 are inserted into the short-circuit rings 16, thus allowing for the free axial thermal expansion of the bars 17.

The conductive bars 17 can be brazed on the short-circuit rings 16.

However, under the effect of the temperature generated by the brazing operation, of up to 700° C., the copper lug of the short-circuit ring 16, which expands, breaks by radial shearing inside the groove of the steel compaction element under the effect of the different coefficients of thermal expansion of copper and steel, and of the ring which is at a higher temperature than the compaction element during the brazing operation.

The embodiments described hereinabove are not suitable for conductive bars brazed on the short-circuit rings 16.

The retaining means described hereinbelow are adapted to the brazing of the conductive bars 17 on the short-circuit rings or to the insertion of the conductive bars 17 into the holes 16a.

Figure 14:
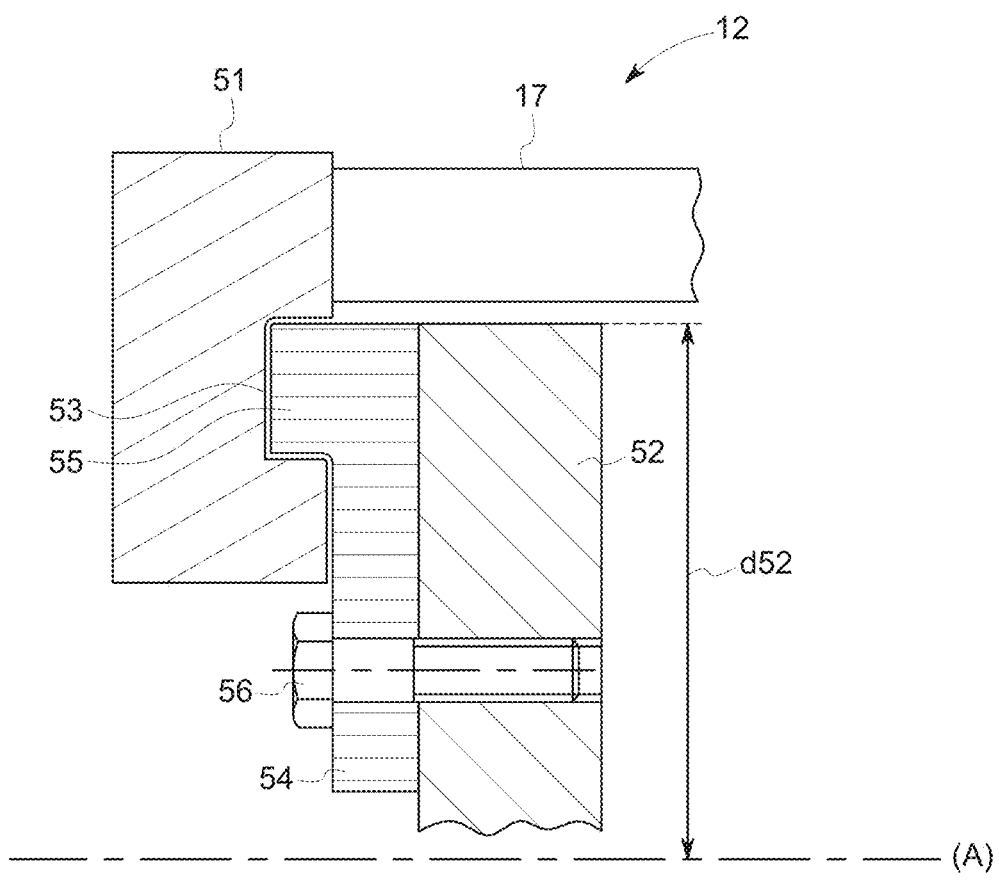
FIG. 14 shows a partial sectional view along an axial direction of an eleventh embodiment of the retaining means.

FIG. 14 shows a partial sectional view along an axial direction of an eleventh embodiment of the retaining means wherein the conductive bars 17 are brazed on a short-circuit ring 51.

The short-circuit ring 51 is no longer in direct contact with a face of a compaction element 52.

The outer diameter d52 of the compaction element 52 is determined such that the outer periphery of the compaction element is not in contact with the conductive bars 17.

The retaining means comprise a groove 53 in a first diameter of the short-circuit ring, a retaining ring 54 comprising, on at least one diameter, a lug 55 and screws 56 evenly distributed over at least one diameter of the retaining ring to secure the retained ring and the compaction element together, the screws 56 being placed under the inner diameter of the short-circuit ring.

The retaining ring 54 is inserted between the short-circuit ring 51 and the compaction element 52.

The lug 55 fits into the groove 53 to form a shoulder and such that the face of the retaining ring 54 opposite that in contact with the short circuit ring 51 is in contact with the compaction element 52 and secured by the screws 56.

During the operation for brazing the bars 17 on the short-circuit ring 51, the screws 56 are not present, which allows for the free radial thermal expansion of the short-circuit ring during the brazing operation.

When the assembly obtained is at ambient temperature, the screws 56 are assembled in order to secure the retaining ring 54 and the compaction element 52 together, and retaining the ring 51 by the lug 55 fitted into the groove 53.

Figure 15:
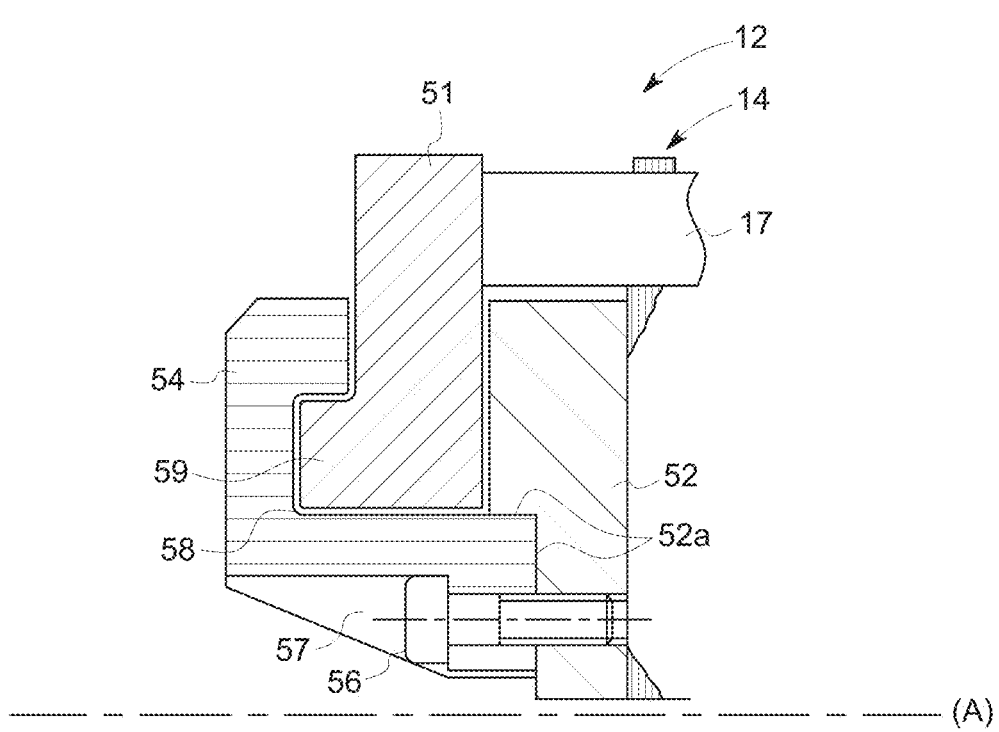
FIG. 15 shows a partial sectional view along an axial direction of a twelfth embodiment of the retaining means.

FIG. 15 shows a partial sectional view along an axial direction of a twelfth embodiment of the retaining means wherein the conductive bars 17 are brazed on a short-circuit ring 51.

This embodiment differs from the preceding embodiment in that the heads of the screws 56 are each disposed in a counterbore 57 in the retaining ring 54 for radially holding the heads of the screws 56 under the effect of centrifugal force, the retaining ring includes a groove 58 in one diameter, and the short-circuit ring 51 includes a lug 59 on a diameter located on the face opposite that in contact with the compaction element 52 such that the lug 59 fits into the groove 58 to form a shoulder so as to hold the short-circuit ring 51 under the effect of centrifugal force.

The retaining ring 54 is retained under the effect of centrifugal force by the end thereof in contact with the compaction element 52, the retaining ring 54 being fitted into a counterbore 52a in the compaction element 52.

Figure 16:
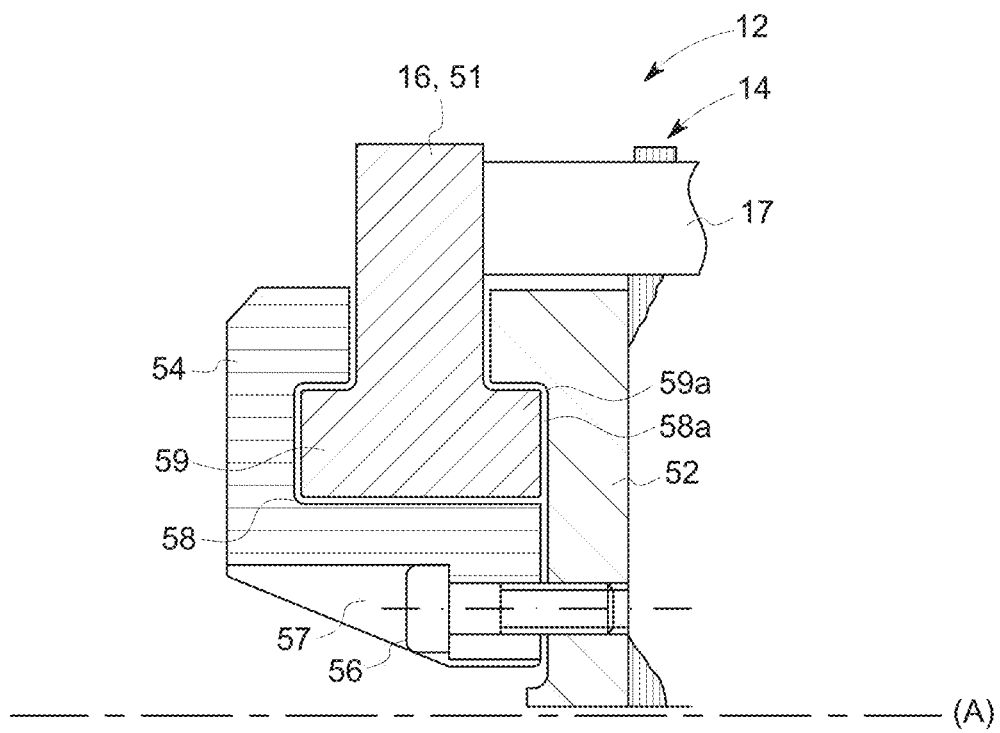
FIG. 16 shows a partial sectional view along an axial direction of a thirteenth embodiment of the retaining means.

FIG. 16 shows a partial sectional view along an axial direction of a thirteenth embodiment of the retaining means wherein the conductive bars 17 are brazed on a short-circuit ring 51, or alternatively, the conductive bars 17 are inserted into the holes 16a in the short-circuit ring 16.

This embodiment differs from the preceding embodiments in that the short-circuit ring 16, 51 comprises a second retaining lug 59a opposite the retaining lug 59 and the compaction element 52 comprises a second groove 58a interacting with the second retaining lug 59a.

The second groove 58a further interacts with the end of the retaining ring 54 which is housed in the groove 58a.

The retaining ring 54 is fixed by the screws 56 to the compaction element 52, which ring radially bears against the lug 59a.

In an alternative embodiment not shown, the short-circuit ring 16, 51 comprises two opposite retaining lugs 59 and 59a which fit into the respective grooves 58 and 58a in the retaining ring 54 and the compaction element 52. Contrary to FIG. 16, the end of the retaining ring 54 comprises a retaining lug 62 which fits into a second groove 63 in the compaction element 52. The fixing screws 56 are located on a larger diameter than the diameter of the second groove 63.

The advantage of a short-circuit ring comprising two opposite retaining lugs 59 and 59a, as shown in FIG. 16, is that the short-circuit ring is better retained by the two lugs thereof under the effect of centrifugal force, allowing the rotor 12 to rotate at higher rotational speeds.

Figure 17:
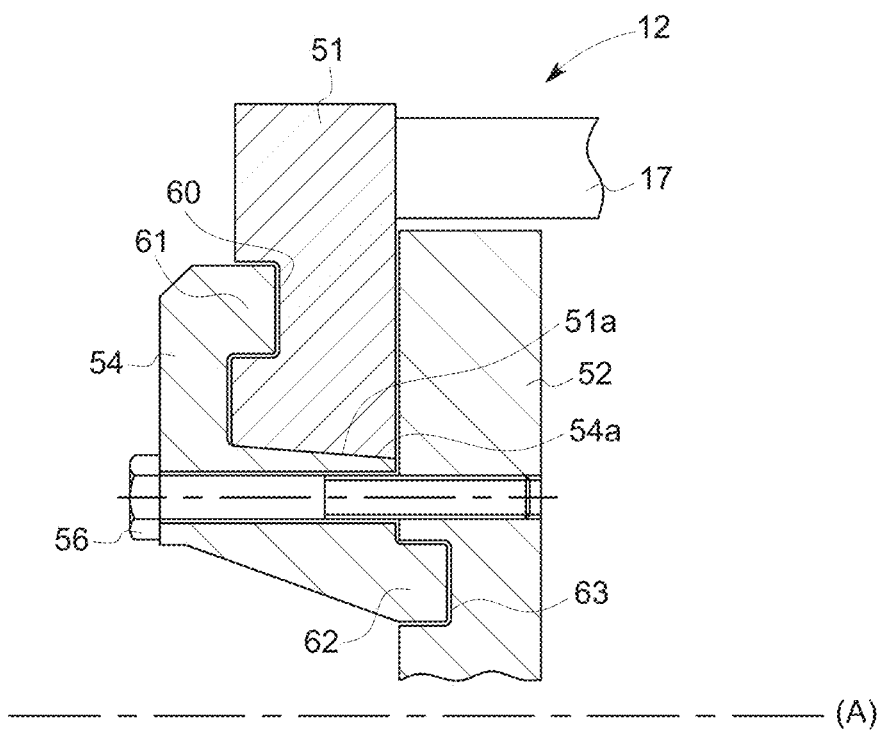
FIG. 17 shows a partial sectional view along an axial direction of a fourteenth embodiment of the retaining means.

FIG. 17 shows a partial sectional view along an axial direction of a fourteenth embodiment of the retaining means wherein the conductive bars 17 are brazed on a short-circuit ring 51.

This embodiment differs from the preceding embodiment in that the retaining means include a groove 60 on a diameter of the face of the short-circuit ring 51 opposite the compaction element 52, and the retaining ring 54 includes a lug 61 which fits into the groove 60 to form a retaining shoulder, the head of the screws 56 not being housed in a counterbore in the retaining ring 54.

The retaining means further include a lug 62 on a diameter of the retaining ring 54 which fits into a groove 63 in the compaction element 52 so as to form a shoulder, the lug 62 being located between the axis of rotation of the rotor and the pitch circle diameter of the fixing screws 56.

Moreover, the inner diameter 51a of the short-circuit ring 51 is tapered and interacts with the tapered outer diameter 54a of the retaining ring 54, procuring a self-centring of the lug 61 and 62 in the groove 60 and 63 when assembling the retaining ring 54 in the compaction element 52.

Figure 18:
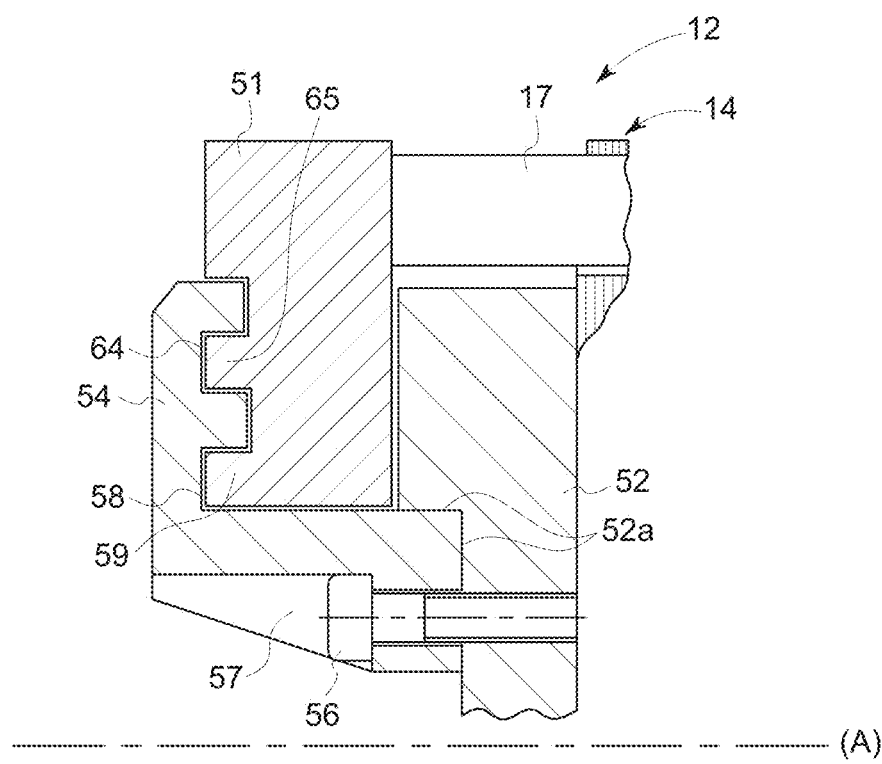
FIG. 18 shows a partial sectional view along an axial direction of a fifteenth embodiment of the retaining means.

FIG. 18 shows a partial sectional view along an axial direction of a fifteenth embodiment of the retaining means wherein the conductive bars 17 are brazed on a short-circuit ring 51.

This embodiment differs from the embodiment shown in FIG. 15 in that the retaining means further comprise a second groove 64 in a second diameter of the retaining ring 54 and a second lug 65 on a second diameter of the short-circuit ring 51 located on the face opposite that in contact with the compaction element 52 such that the second lug 65 fits into the second groove 64 so as to form a second shoulder and to hold the short-circuit ring.

Alternatively, after the brazing operation, the retaining grooves can be machined to obtained an improved coaxiality with the two lugs of the retaining ring 54.

Figure 19:
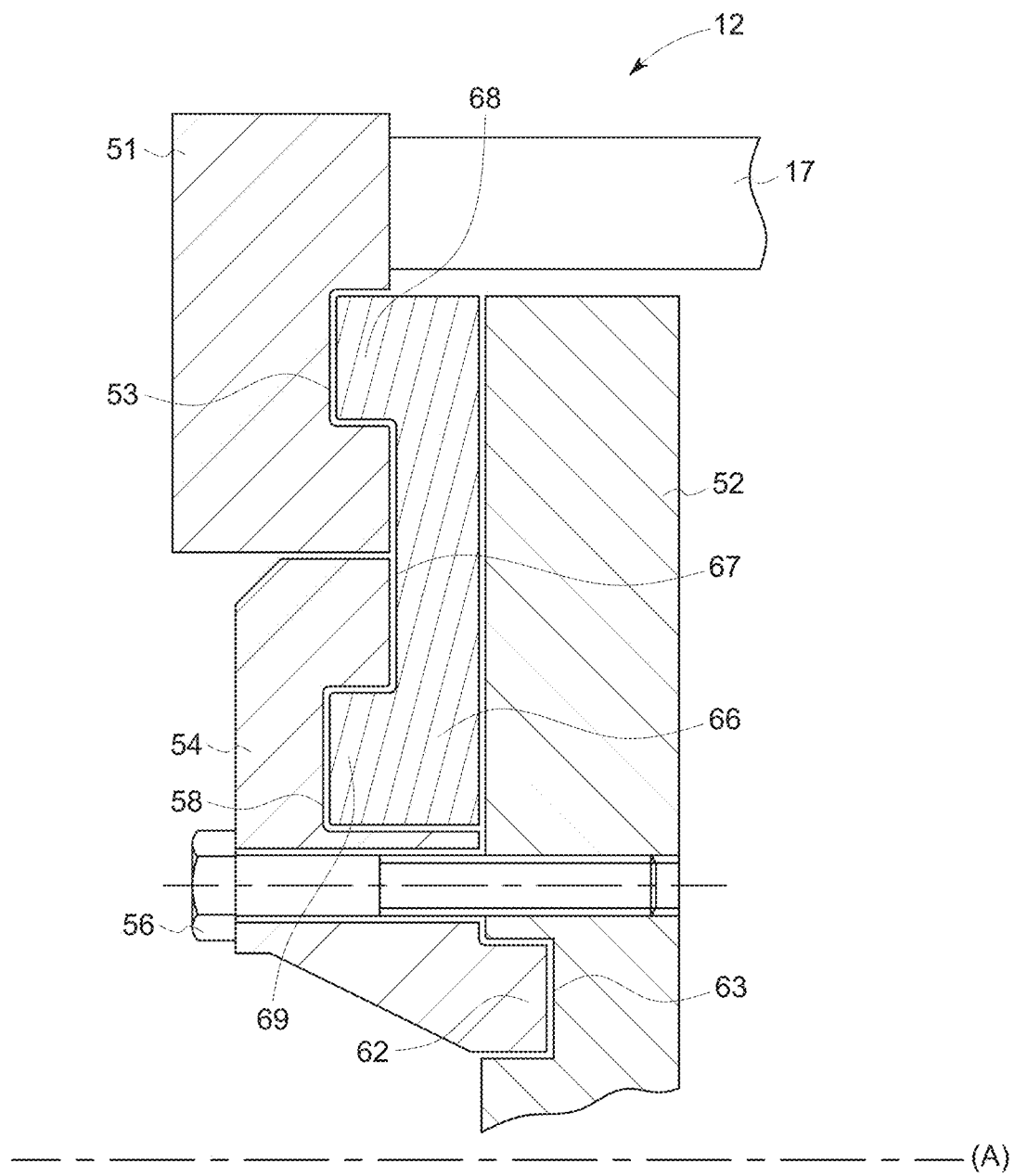
FIG. 19 shows a partial sectional view along an axial direction of a sixteenth embodiment of the retaining means.

FIG. 19 shows a partial sectional view along an axial direction of a sixteenth embodiment of the retaining means wherein the conductive bars 17 are brazed on a short-circuit ring 51.

It shows the retaining ring 54 secured to the compaction element 52 by the screws 56 and the lug 62 fitting into the groove 63, the groove 58, the short circuit ring 51 comprising the groove 53.

The retaining means further include a holding ring 66 comprising a face in contact with the compaction element 52 and a groove 67 on the face opposite that in contact with the compaction element such that the ends 68 and 69 of the holding ring fit into the grooves 53 and 58 of the short-circuit ring 51 and of the retaining ring 54.

This embodiment, as with those described in FIGS. 14 to 18, allows the bars 17 to be brazed on the short-circuit ring 51 with free radial thermal expansion of the short-circuit ring during the brazing operation, the means for retaining under centrifugal force being produced by assembling the retaining ring 54 in the compaction element 52 after the brazing operation when the temperature of the short-circuit ring has returned to ambient temperature.

According to other embodiments, each end of the rotor can comprise retaining means of the same type or retaining means of different types.

The retaining means including two grooves or two fixing lugs or two rows of fixing screws on the short-circuit ring are particularly adapted to a peripheral speed of the rotor of less than 160 m/s.

When the peripheral speed of rotation exceeds 160 m/s and reaches up to 200 m/s, the short-circuit rings must be bound, which complements the retaining means described hereinabove.

According to other embodiments not shown, if the short-circuit ring is large in size, the ring is segmented, the segments of the ring being separated by a circumferential expansion clearance. The segments are electrically connected to one another for example by brazed, welded or preferably screwed connections on the ring.

Figure 20:
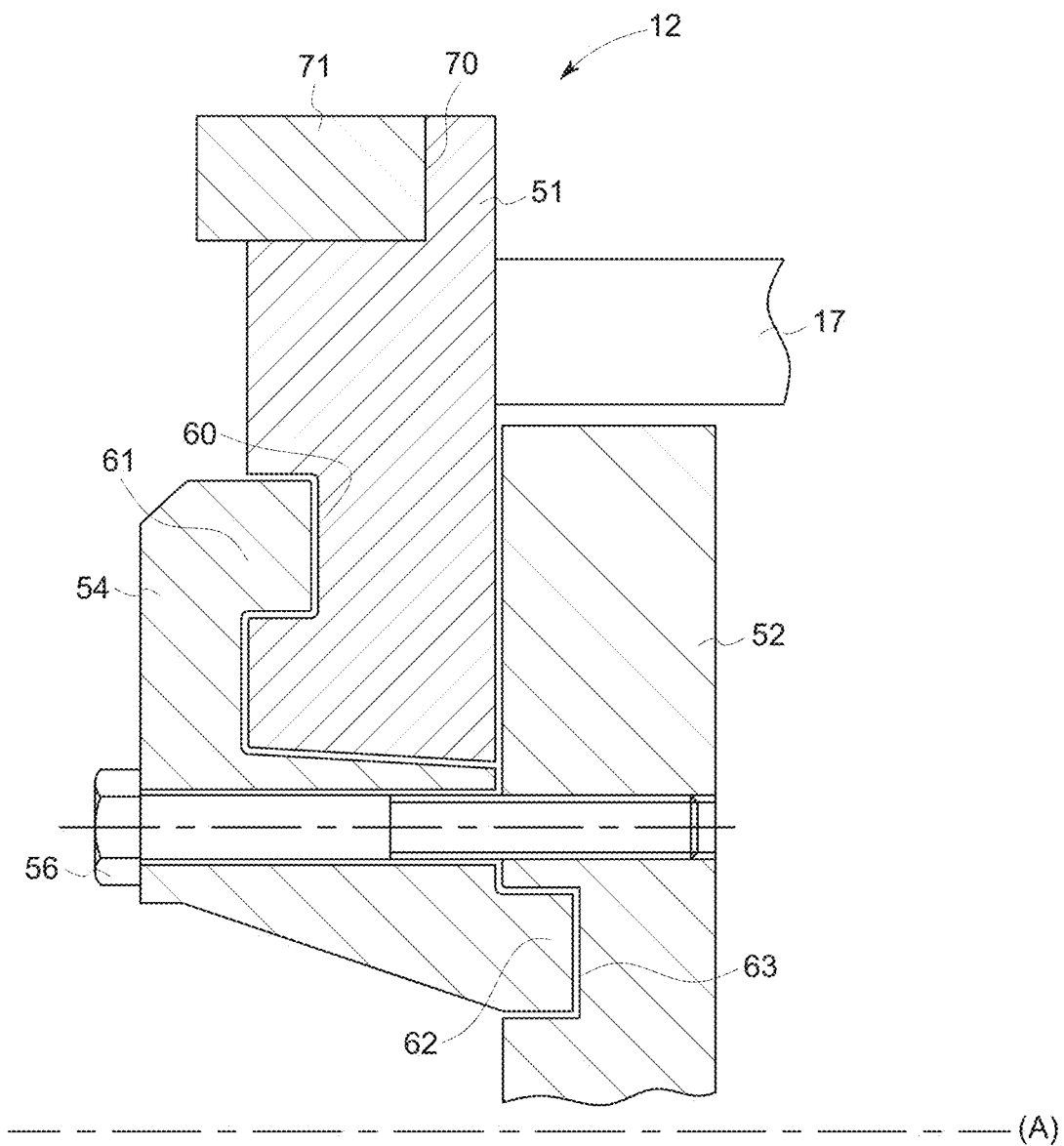
FIG. 20 shows a partial sectional view along an axial direction of a seventeenth embodiment of the retaining means.

FIG. 20 shows a partial sectional view along an axial direction of a seventeenth embodiment of the retaining means including a binding of the short-circuit ring 51.

This embodiment differs from that shown in FIG. 17 in that the short-circuit ring comprises a recess 70 opening out onto the outer periphery of the ring.

A binding band 71 is inserted into the recess 70 to hold the short-circuit ring 51 under the effect of centrifugal force.

The binding band 71 is made of a non-magnetic material to prevent it from heating up under the effect of the magnetic field induced by the stator coils.

The binding band 71 is, for example, made of stainless steel.

It goes without saying that the example retaining means described hereinabove can comprise a binding band 71.

According to other embodiments, electrical insulation means are disposed beneath the head of the screw and/or along the screw body and/or between the short-circuit ring and the compaction element.

The insulation means prevent an interfering electric current from flowing through the fixing screws in the magnetic mass 14.

The radial thickness of the retaining lug is preferably equal to a value in a range from 10% to 40% of the radial thickness of the short-circuit ring and the length in an axial direction of the retaining lug is preferably equal to a value in a range from 15% to 50% of the axial thickness of the short-circuit ring.

Preferably, the axial thickness of the compaction elements is greater than twenty times the axial thickness of the magnetic sheets 18 or 25.

The retaining means described allow the peripheral speed of the rotor to be increased without the use of a non-magnetic steel band for binding the short-circuit ring up to a peripheral speed of 160 m/s, thus reducing expensive operations for machining, binding the binding band and supplying non-magnetic materials with high mechanical properties.

We claim:

1. Rotor for a squirrel-cage asynchronous rotating electrical machine, comprising,
    two compaction elements clamping a cylindrical magnetic mass,
    short-circuit rings facing the face of the compaction elements opposite that in contact with the magnetic mass, and
    conductive bars housed in recesses in the magnetic mass and distributed evenly over at least one diameter of the magnetic mass such that the short-circuit rings and the conductive bars form a squirrel cage, characterised in that retaining means distributed over at least one diameter of each short-circuit ring and over at least one diameter of each compaction element interact so as to secure the short-circuit rings and the compaction elements together, the pitch circle diameters of the retaining means on the rings and the compaction elements being smaller than the pitch circle diameter of the conductive bars, wherein holes are evenly distributed over a diameter of the short-circuit ring to house the conductive bars in the magnetic mass, the holes being coaxial with the recesses of the conductive bars, the holes having a dimension that is smaller than a dimension of the conductive bars such that when the bars are inserted into the circular holes, a knurled end of each conductive bar deforms to create an electrical contact between said bar and the short-circuit ring.

2. Rotor according to claim 1, wherein the retaining means comprise a groove in the at least one diameter of the compaction element, a lug on the at least one diameter of the short-circuit ring such that the lug fits into the groove to form a shoulder, and screws evenly distributed over at least one diameter of the short-circuit ring to secure the short-circuit ring and the compaction element together.

3. Rotor according to claim 2, wherein the retaining means further comprise a second groove in a second diameter of the compaction element and a second lug on a second diameter of the short-circuit ring such that the second lug fits into the second groove to form a second shoulder, the second diameters being smaller than the first diameters.

4. Rotor according to claim 2, further comprising screws distributed over a second diameter of the short-circuit ring, the screws on said second diameter passing through the lug.

5. Rotor according to claim 1, wherein the retaining means comprise a groove in the at least one diameter of the short-circuit ring, a lug on the at least one diameter of the compaction element such that the lug fits into the groove to form a shoulder, and screws evenly distributed over at least one diameter of the short-circuit ring to secure the short-circuit ring and the compaction element together.

6. Rotor according to claim 5, wherein the retaining means further comprise a second groove in a second diameter of the compaction element such that one end of the short-circuit ring fits into the second groove to form a second shoulder, the second diameter being smaller than the first diameter.

7. Rotor according to claim 1, wherein the pitch circle diameter of the bars in the short-circuit ring being smaller than the pitch circle diameter of the conductive bars in the magnetic mass in order to produce a radial bending preload of the conductive bars.

8. Rotor according to claim 1, wherein the retaining means at each end of the rotor are of different types.

9. Rotor according to claim 1, wherein the retaining means comprise a groove in the at least one diameter of the short-circuit ring, a retaining ring comprising, on at least one diameter, a lug such that the lug fits into the groove to form a shoulder and such that the face of the retaining ring opposite that facing the short-circuit ring is in contact with the compaction element, and screws distributed evenly over at least one diameter of the retaining ring to secure the retaining ring and the compaction element together.

10. Rotor according to claim 1, wherein retaining means comprise a retaining ring secured to the compaction element by screws distributed evenly over at least one diameter of the retaining ring and comprising a groove in at least one diameter, the short-circuit ring comprising a lug on at least one diameter located on the face opposite that facing the compaction element such that the lug fits into the groove so as to hold the short-circuit ring.

11. Rotor according to claim 10, wherein the short-circuit ring further comprises a second retaining lug opposite the retaining lug and the compaction element comprises a second groove interacting with the second retaining lug.

12. Rotor according to claim 1, wherein the retaining means further include a lug on a diameter of the retaining ring which fits into a groove in the compaction element so as to form a shoulder, the lug being located between the axis of rotation of the rotor and the pitch circle diameter of the fixing screws.

13. Rotor according to claim 1, wherein the retaining means further comprise a second groove in at least one diameter of the retaining ring and a second lug on a second diameter of the short-circuit ring located on the face opposite that facing the compaction element such that the second lug fits into the second groove so as to hold the short-circuit ring.

14. Rotor according to claim 1, wherein the retaining means comprise a retaining ring secured to the compaction element by screws distributed evenly over at least one diameter of the retaining ring and comprising a groove in at least one diameter, the short-circuit ring comprising a groove in at least one diameter located on the face facing that of the compaction element, and a holding ring comprising a face in contact with the compaction element and comprising a groove in the face opposite that in contact with the compaction element such that the ends of the holding ring fit into the grooves of the short-circuit ring and of the retaining ring.

15. Rotor according to claim 1, wherein the ends of the conductive bars are brazed on the short-circuit rings.

16. Rotor according to claim 1, further comprising a binding band surrounding the short-circuit ring, with the binding band being non-magnetic.

17. Rotor according to claim 1, wherein electrical insulation means are disposed under the head of the screw and/or along the screw body and/or between the short-circuit ring and the compaction element.

18. Rotor according to claim 1, wherein the compaction element comprises a clamping plate or a compaction flange of a non-through half-shaft.

19. Squirrel-cage asynchronous rotating electrical machine comprising a rotor according to claim 1.

* * * * *